United States Patent
Cowgill et al.

(10) Patent No.: US 9,399,956 B2
(45) Date of Patent: Jul. 26, 2016

(54) PHASER CONTROL SYSTEMS AND METHODS FOR BALANCING MEAN EFFECTIVE PRESSURE

(71) Applicant: GM Global Technology Operations LLC, Detroit, MI (US)

(72) Inventors: Joshua D. Cowgill, Hartland, MI (US); Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 719 days.

(21) Appl. No.: 13/833,269

(22) Filed: Mar. 15, 2013

(65) Prior Publication Data

US 2014/0278009 A1    Sep. 18, 2014

(51) Int. Cl.
| F02D 13/02 | (2006.01) |
| F02D 41/00 | (2006.01) |
| F02B 37/00 | (2006.01) |
| F02B 37/007 | (2006.01) |
| F02D 13/06 | (2006.01) |
| F02B 37/16 | (2006.01) |
| F02B 37/18 | (2006.01) |

(52) U.S. Cl.
CPC .......... *F02D 13/0219* (2013.01); *F02B 37/001* (2013.01); *F02B 37/002* (2013.01); *F02B 37/007* (2013.01); *F02D 41/0007* (2013.01); *F02D 41/0082* (2013.01); *F02B 37/16* (2013.01); *F02B 37/18* (2013.01); *F02D 13/06* (2013.01); *F02D 41/0085* (2013.01); *F02D 2041/001* (2013.01); *Y02T 10/144* (2013.01); *Y02T 10/18* (2013.01)

(58) Field of Classification Search
CPC . F02D 13/02; F02D 13/0203; F02D 13/0207; F02D 13/0211; F02D 13/0215; F02D 13/0219; F02D 33/02; F02D 35/023; F02D 41/0002; F02D 2041/001; F02D 41/008; F02D 41/0082; F02D 41/0085
See application file for complete search history.

(56) References Cited

U.S. PATENT DOCUMENTS

| 6,536,389 | B1 * | 3/2003 | Shelby | F01L 1/34 123/90.15 |
| 7,178,507 | B1 * | 2/2007 | Gangopadhyay | F02D 35/023 123/27 R |
| 2007/0270983 | A1 * | 11/2007 | Yasui | F02D 35/023 700/31 |
| 2009/0018756 | A1 * | 1/2009 | Storhok | F02D 41/0007 701/105 |
| 2012/0118267 | A1 * | 5/2012 | Kang | F02D 13/0207 123/406.26 |
| 2013/0245921 | A1 * | 9/2013 | Glugla | F02D 41/0085 701/105 |
| 2014/0046571 | A1 * | 2/2014 | Cowgill | F02D 41/0085 701/102 |

* cited by examiner

*Primary Examiner* — Erick Solis
*Assistant Examiner* — Anthony L Bacon

(57) ABSTRACT

An engine control system includes a mean effective pressure (MEP) module, an imbalance module, and a phaser control module. The MEP module determines MEPs for combustion cycles of cylinders, respectively, of an engine. The imbalance module selectively determines whether first and second banks of the cylinders are imbalanced based on the MEPs. When the first and second banks of cylinders are imbalanced, the phaser control module selectively adjusts at least one of: a first phaser of an intake camshaft of the second bank of cylinders; and a second phaser of an exhaust camshaft of the second bank of cylinders.

20 Claims, 4 Drawing Sheets

PHASER CONTROL SYSTEMS AND METHODS FOR BALANCING MEAN EFFECTIVE PRESSURE

FIELD

The present disclosure relates to internal combustion engines and more particularly to intake and exhaust valve control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. In some engines, the cylinders may be arranged in two separate banks of cylinders. A first intake camshaft regulates opening and closing of intake valves of a first bank of cylinders. A first exhaust camshaft regulates opening and closing of exhaust valves of the first bank of cylinders. A first intake cam phaser controls rotation of the first intake camshaft. A first exhaust cam phaser controls rotation of the first exhaust camshaft.

Similarly, a second intake camshaft regulates opening and closing of intake valves of a second bank of cylinders. A second exhaust camshaft regulates opening and closing of exhaust valves of a second bank of cylinders. A second intake cam phaser controls rotation of the second intake camshaft. A second exhaust cam phaser controls rotation of the second exhaust camshaft. An engine control module may control the first and second intake and exhaust cam phasers. The ability to control phasing of each of the camshafts independently may be referred to as dual, independent camshaft phasing (DICP).

SUMMARY

In a feature, an engine control system includes a mean effective pressure (MEP) module, an imbalance module, and a phaser control module. The MEP module determines MEPs for combustion cycles of cylinders, respectively, of an engine. The imbalance module selectively determines whether first and second banks of the cylinders are imbalanced based on the MEPs. When the first and second banks of cylinders are imbalanced, the phaser control module selectively adjusts at least one of: a first phaser of an intake camshaft of the second bank of cylinders; and a second phaser of an exhaust camshaft of the second bank of cylinders.

In further features, the phaser control module: determines first and second target phaser positions for the first bank of cylinders; controls a third phaser of a second intake camshaft of the first bank of cylinders based on the first target phaser position; controls a fourth phaser of a second exhaust camshaft of the first bank of cylinders based on the second target phaser position; and, when the first and second banks of cylinders are not imbalanced: sets third and fourth target phaser positions for the second bank of cylinders equal to the first and second target phaser positions, respectively; controls the first phaser based on the third target phaser position; and controls the second phaser based on the fourth target phaser position.

In still further features, the phaser control module: determines first and second target phaser positions for the first bank of cylinders based on a torque request and at least one engine operating parameter; controls a third phaser of a second intake camshaft of the first bank of cylinders based on the first target phaser position; controls a fourth phaser of a second exhaust camshaft of the first bank of cylinders based on the second target phaser position; and, when the first and second banks of cylinders are imbalanced: determines third and fourth target phaser positions for the second bank of cylinders based on the torque request and the at least one engine operating parameter; controls the first phaser based on the third target phaser position; and controls the second phaser based on the fourth target phaser position.

In yet further features, when the first and second banks of cylinders are imbalanced after the adjustment, the phaser control module further selectively adjusts at least one of: a third phaser of a second intake camshaft of the first bank of cylinders; and a fourth phaser of a second exhaust camshaft of the first bank of cylinders.

In further features, the phaser control module: determines first and second target phaser positions for the first bank of cylinders; controls a third phaser of a second intake camshaft of the first bank of cylinders based on the first target phaser position; controls a fourth phaser of a second exhaust camshaft of the first bank of cylinders based on the second target phaser position; and, when the first and second banks of cylinders are imbalanced after the adjustment, selectively adjusts at least one of the first and second target phaser positions by a predetermined amount.

In still further features, the phaser control module: determines the first and second target phaser positions based on a torque request and at least one engine operating parameter; determines third and fourth target phaser positions based on the torque request and the at least one engine operating parameter; controls the first phaser based on the third target phaser position; and controls the second phaser based on the fourth target phaser position.

In further features, the engine control system further includes a boost actuator module that selectively decreases opening of a cutoff valve to decrease exhaust flow through the cutoff valve and a turbocharger turbine. The phaser control module selectively adjusts at least one of the first and second phasers when the first and second banks of cylinders are imbalanced and the opening of the cutoff valve is decreased.

In yet further features, the phaser control module selectively adjusts at least one of the first and second phasers when the first and second banks of cylinders are imbalanced and a first pressure in a first exhaust pipe that receives exhaust from the first bank of cylinders is one of greater than and less than a second pressure in a second exhaust pipe that receives exhaust from the second bank of cylinders.

In further features, the imbalance module determines a first imbalance parameter for the first bank of cylinders based on the MEPs of the cylinders of the first bank, determines a second imbalance parameter for the second bank of cylinders based on the MEPs of the cylinders of the second bank, and determines whether the first and second banks of cylinders are imbalanced based on the first and second imbalance parameters.

In still further features, the imbalance module determines a bank-to-bank imbalance parameter based on the first and second imbalance parameters and determines whether the first and second banks of cylinders are imbalanced based on a comparison of the bank-to-bank imbalance parameter and a predetermined imbalance value.

In a feature, an engine control method includes: determining mean effective pressures (MEPs) for combustion cycles of cylinders, respectively, of an engine; selectively determining whether first and second banks of the cylinders are imbalanced based on the MEPs; and, when the first and second banks of cylinders are imbalanced, selectively adjusting at least one of: a first phaser of an intake camshaft of the second bank of cylinders; and a second phaser of an exhaust camshaft of the second bank of cylinders.

In still further features, the engine control method further includes: determining first and second target phaser positions for the first bank of cylinders; controlling a third phaser of a second intake camshaft of the first bank of cylinders based on the first target phaser position; controlling a fourth phaser of a second exhaust camshaft of the first bank of cylinders based on the second target phaser position; and, when the first and second banks of cylinders are not imbalanced: setting third and fourth target phaser positions for the second bank of cylinders equal to the first and second target phaser positions, respectively; controlling the first phaser based on the third target phaser position; and controlling the second phaser based on the fourth target phaser position.

In yet further features, the engine control method further includes: determining first and second target phaser positions for the first bank of cylinders based on a torque request and at least one engine operating parameter; controlling a third phaser of a second intake camshaft of the first bank of cylinders based on the first target phaser position; controlling a fourth phaser of a second exhaust camshaft of the first bank of cylinders based on the second target phaser position; and, when the first and second banks of cylinders are imbalanced: determining third and fourth target phaser positions for the second bank of cylinders based on the torque request and the at least one engine operating parameter; controlling the first phaser based on the third target phaser position; and controlling the second phaser based on the fourth target phaser position.

In further features, the engine control method further includes, when the first and second banks of cylinders are imbalanced after the adjustment, selectively adjusting at least one of: a third phaser of a second intake camshaft of the first bank of cylinders; and a fourth phaser of a second exhaust camshaft of the first bank of cylinders.

In still further features, the engine control method further includes: determining first and second target phaser positions for the first bank of cylinders; controlling a third phaser of a second intake camshaft of the first bank of cylinders based on the first target phaser position; controlling a fourth phaser of a second exhaust camshaft of the first bank of cylinders based on the second target phaser position; and, when the first and second banks of cylinders are imbalanced after the adjustment, selectively adjusting at least one of the first and second target phaser positions by a predetermined amount.

In yet further features, the engine control method further includes: determining the first and second target phaser positions based on a torque request and at least one engine operating parameter; determining third and fourth target phaser positions based on the torque request and the at least one engine operating parameter; controlling the first phaser based on the third target phaser position; and controlling the second phaser based on the fourth target phaser position.

In further features, the engine control method further includes: selectively decreasing opening of a cutoff valve to decrease exhaust flow through the cutoff valve and a turbocharger turbine; and selectively adjusting at least one of the first and second phasers when the first and second banks of cylinders are imbalanced and the opening of the cutoff valve is decreased.

In still further features, the engine control method further includes selectively adjusting at least one of the first and second phasers when the first and second banks of cylinders are imbalanced and a first pressure in a first exhaust pipe that receives exhaust from the first bank of cylinders is one of greater than and less than a second pressure in a second exhaust pipe that receives exhaust from the second bank of cylinders.

In yet further features, the engine control method further includes: determining a first imbalance parameter for the first bank of cylinders based on the MEPs of the cylinders of the first bank; determining a second imbalance parameter for the second bank of cylinders based on the MEPs of the cylinders of the second bank; and determining whether the first and second banks of cylinders are imbalanced based on the first and second imbalance parameters.

In further features, the engine control method further includes: determining a bank-to-bank imbalance parameter based on the first and second imbalance parameters; and determining whether the first and second banks of cylinders are imbalanced based on a comparison of the bank-to-bank imbalance parameter and a predetermined imbalance value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts air and fuel within cylinders to generate drive torque. Exhaust is a byproduct of combustion of air and fuel within the cylinders. A first sub-set of the cylinders output exhaust to a first exhaust pipe, and a second sub-set of the cylinders output exhaust to a second exhaust pipe.

Under some circumstances, a pressure within the first exhaust pipe may be greater than or less than a pressure within the second exhaust pipe. For example, a pressure difference may occur when a cutoff valve is closed to prevent exhaust flow through one of the first and second exhaust pipes. When the cutoff valve is closed, exhaust may flow to the other one of the first and second exhaust pipes through a crossover pipe connected between the first and second exhaust pipes.

Such a pressure difference, however, may cause an imbalance between the first and second banks of cylinders. An engine control module (ECM) of the present disclosure selectively adjusts at least one of intake and exhaust cam phasing of one of the first and second banks of cylinders to reduce the imbalance. When the imbalance continues after the adjustment, the ECM may selectively adjust at least one of intake and exhaust cam phasing of the other one of the first and second banks of cylinders to reduce the imbalance.

Figure 1:
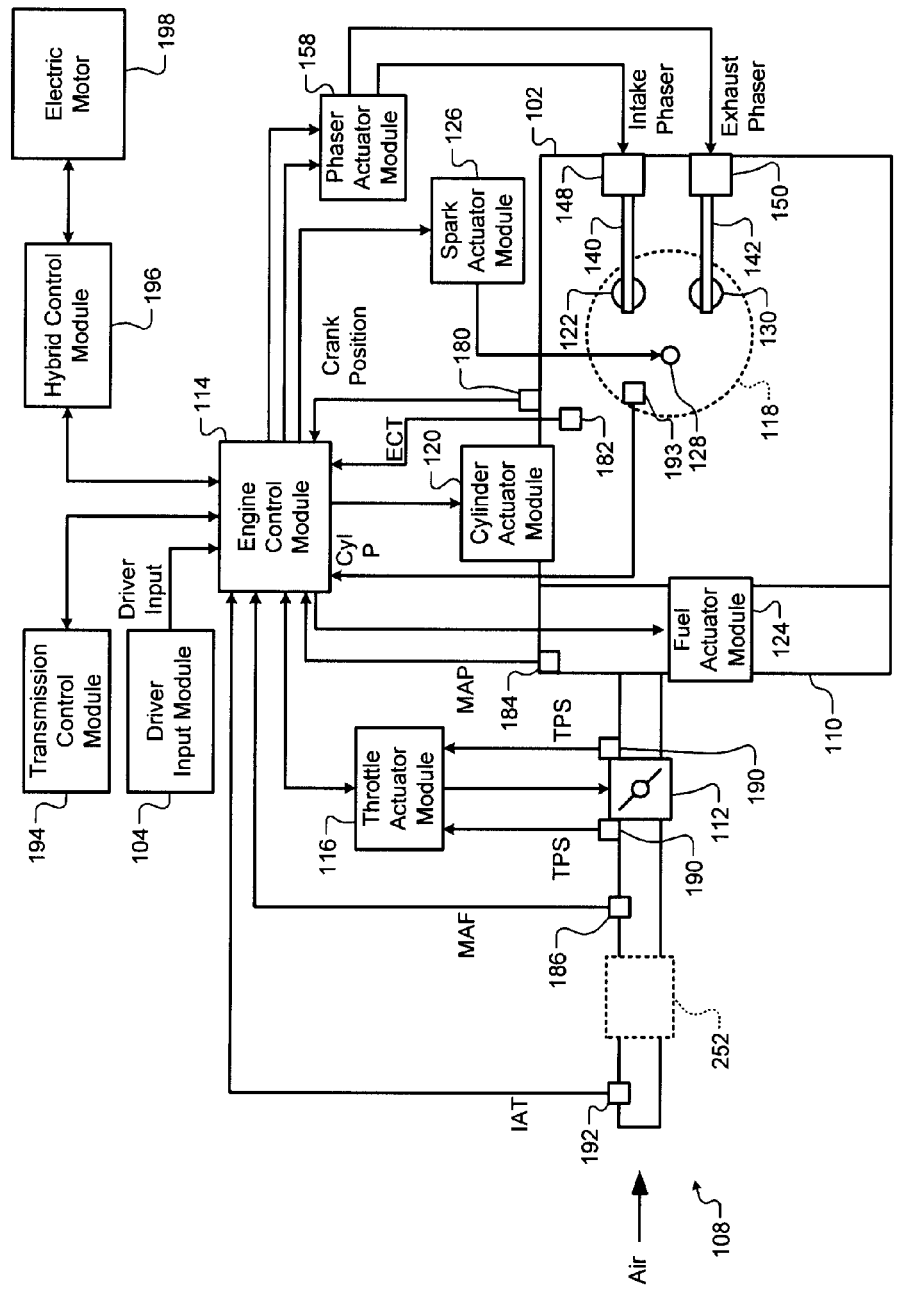
FIG. 1 is a functional block diagram of an example engine system according to the present disclosure.

Referring now to FIG. 1, a functional block diagram of an example engine system is presented. The engine system includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. Under some circumstances, the ECM 114 may instruct a cylinder actuator module 120 to selectively deactivate one or more of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system.

The intake valve 122 may be controlled by an intake camshaft 140, while the exhaust valve 130 may be controlled by an exhaust camshaft 142. The intake camshaft 140 may also control the intake valves of other cylinders of a first cylinder bank including the cylinder 118. A second intake camshaft (not shown) may control the intake valves of cylinders of a second cylinder bank.

The exhaust camshaft 142 may control the exhaust valves of the other cylinders of the first cylinder bank, and a second exhaust camshaft may control the exhaust valves of the cylinders of the second cylinder bank. The cylinder actuator module 120 may deactivate the cylinder 118 by disabling opening of the intake valve 122 and/or the exhaust valve 130.

An intake cam phaser 148 selectively adjusts rotation of the intake camshaft 140 relative to rotation of the crankshaft. Adjusting the rotation of the intake camshaft 140 adjusts opening and closing timing of the intake valve 122. A second intake cam phaser (not shown) may selectively adjust rotation of the second intake camshaft relative to rotation of the crankshaft.

An exhaust cam phaser 150 selectively adjusts rotation of the exhaust camshaft 142 relative to rotation of the crankshaft. Adjusting the rotation of the exhaust camshaft 142 adjusts opening and closing timing of the exhaust valve 130. A second exhaust cam phaser (not shown) may selectively adjust rotation of the second exhaust camshaft relative to rotation of the crankshaft.

A phaser actuator module 158 controls the intake cam phaser 148 and the exhaust cam phaser 150 based on signals from the ECM 114. When implemented, variable valve lift (not shown) may also be controlled by the phaser actuator module 158. The phaser actuator module 158 may also control the second intake and exhaust cam phasers based on signals from the ECM 114. While camshaft-based valve actuation is shown and discussed, camless valve actuation may be implemented.

Figure 2:
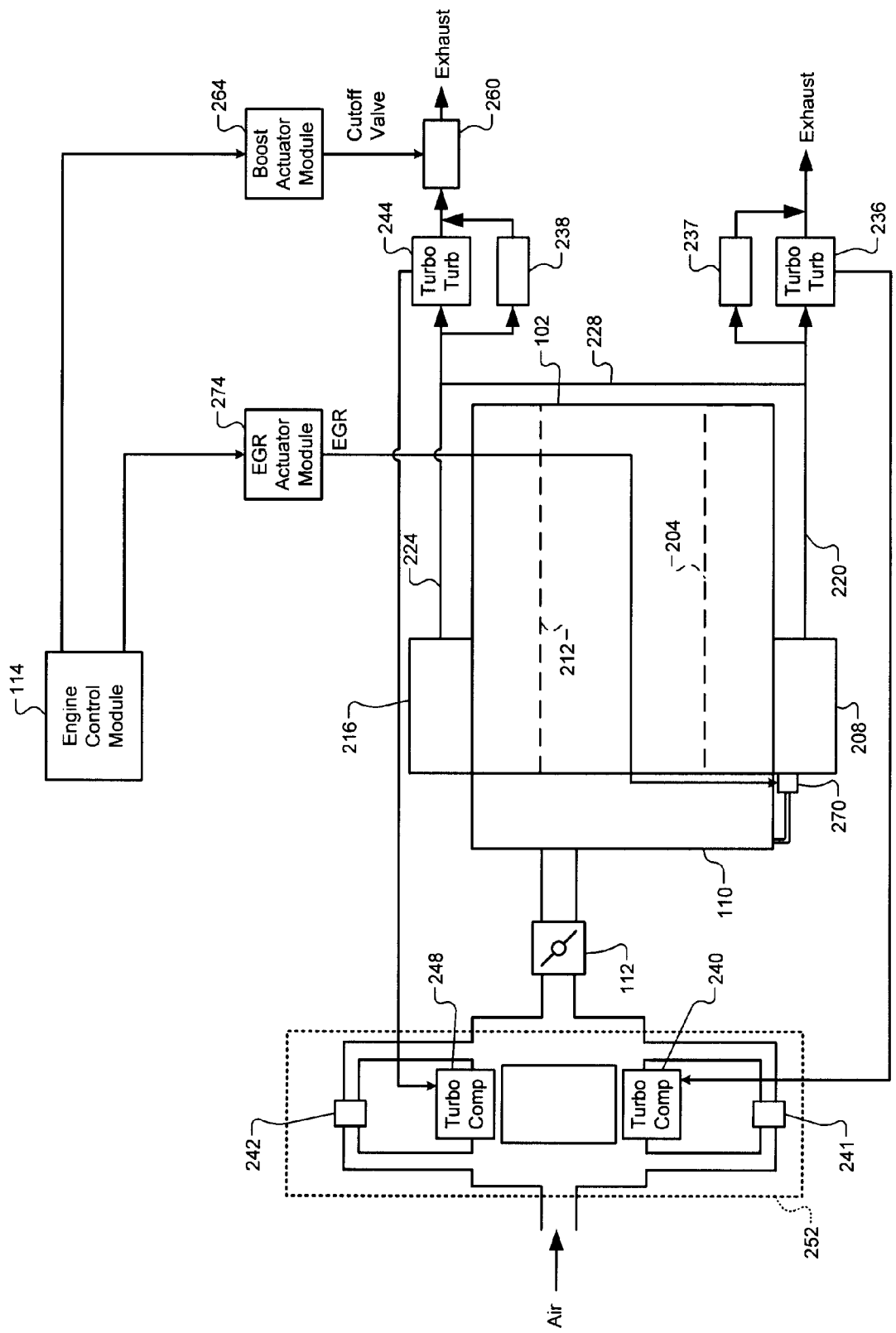
FIG. 2 is a functional block diagram of an example engine and exhaust system according to the present disclosure.

Referring now to FIG. 2, a functional block diagram of an example engine and exhaust system is presented. A first bank (sub-set) 204 of cylinders of the engine 102 outputs exhaust to a first exhaust manifold 208. A second bank 212 of cylinders of the engine 102 outputs exhaust to a second exhaust manifold 216.

The first exhaust manifold 208 outputs the exhaust from the first bank 204 to a first exhaust pipe 220. The second exhaust manifold 216 outputs the exhaust from the second bank 212 of cylinders to a second exhaust pipe 224. A crossover pipe 228 is connected between the first and second exhaust pipes 220 and 224. Exhaust can flow from the first exhaust pipe 220 to the second exhaust pipe 224 through the crossover pipe 228 and vice versa.

The engine system includes first and second turbochargers that provide pressurized air to the intake manifold 110. The first and second turbochargers may be single scroll turbochargers. The first turbocharger includes a first turbine 236 and a first compressor 240. The second turbocharger includes a second turbine 244 and a second compressor 248. Exhaust flow through the first turbine 236 drives the first turbine 236, and exhaust flow through the second turbine 244 drives the second turbine 244. A first turbine bypass valve 237 (or wastegate) may enable exhaust to bypass the first turbine 236. A second turbine bypass valve 238 (or wastegate) may enable exhaust to bypass the second turbine 244.

The first and second turbines 236 and 244 are located downstream of the locations where the crossover pipe joins the first and second exhaust pipes 220 and 224. In other words, the crossover pipe 228 is connected between the first and second exhaust pipes 220 and 225 upstream of the first and second turbines 236 and 244. If the crossover pipe 228 was connected downstream of the first and second turbines 236 and 244, exhaust gas from both of the first and second banks 204 and 212 could not be used to drive the same turbine. If the crossover pipe 228 was connected downstream of one turbine and upstream of one turbine, exhaust gas energy would be wasted.

The first turbine 236 is mechanically coupled to the first compressor 240, and the first turbine 236 drives rotation of the first compressor 240. The first compressor 240 provides compressed air to the throttle valve 112. A first compressor bypass valve 241 may enable air to bypass the first compressor 240. The second turbine 244 is mechanically coupled to the second compressor 248, and the second turbine 244 drives rotation of the second compressor 248. The second compressor 248 also provides compressed air to the throttle valve 112. A second compressor bypass valve 242 may enable air to bypass the second compressor 248. The first and second compressors 240 and 248, the first and second compressor bypass valves 241 and 242, and associated tubing is collectively illustrated by 252 in FIGS. 1 and 2. In various implementations, the MAF sensor 186 may be located upstream of the first and second compressors 240 and 248. Additionally, one MAF sensor may be provided for each bank of cylinders.

A cutoff valve 260 is actuatable to vary exhaust flow through the cutoff valve 260. When the cutoff valve 260 is actuated to cut off exhaust flow, the exhaust from the second bank 212 of cylinders is directed to the first exhaust pipe 220 through the crossover pipe 228. The cutoff valve 260 may be actuated to cut off exhaust flow, for example, to reduce or prevent exhaust flow through the second turbine 244. Reducing exhaust flow through the second turbine 244 reduces the output of the second compressor 248. When the cutoff valve 260 is closed to cut off exhaust flow, the second bank 212 of cylinders will generally experience greater backpressure and lower IMEP relative to the first bank 204 of cylinders.

The ECM 114 may control boost (e.g., amount of intake air compression) provided by the first and/or second turbochargers via a boost actuator module 264. More specifically, the ECM 114 may control the cutoff valve 260, the first and second turbine bypass valves 237 and 238, and/or the first and second compressor bypass valves 241 and 242 via the boost actuator module 264. For example, the boost actuator module 264 may control duty cycle or position of the first turbine bypass valve 237, the second turbine bypass valve 238, the first compressor bypass valve 241, the second compressor bypass valve 242, and the cutoff valve 260 to control boost provided by the first and second turbochargers.

The engine system may also include an exhaust gas recirculation (EGR) valve 270 that selectively redirects exhaust gas back to the intake manifold 110. An EGR actuator module 274 may control the EGR valve 270 based on signals from the ECM 114.

Referring back to FIG. 1, a position of the crankshaft may be measured using a crankshaft position sensor 180. An engine speed, for example in revolutions per minute (RPM), may be generated based on the position of the crankshaft. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which may refer to a difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. A pressure within the cylinder 118 may be measured using a cylinder pressure sensor 193. A cylinder pressure sensor may be provided for each cylinder. The ECM 114 may use signals from the sensors to make control decisions for the engine system.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Figure 3:
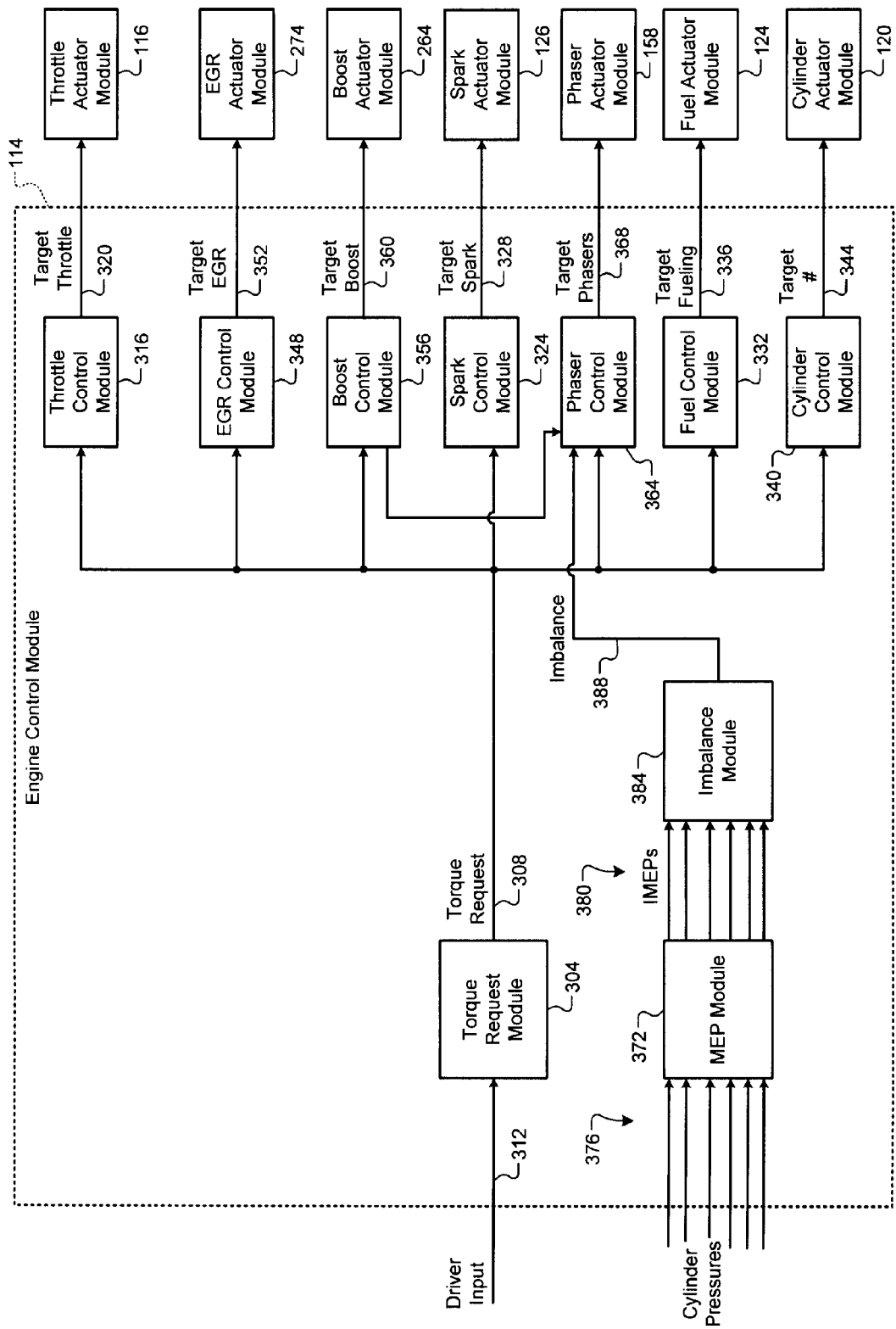
FIG. 3 is a functional block diagram of an example engine control module according to the present disclosure.

Referring now to FIG. 3, a functional block diagram of an example implementation of the ECM 114 is presented. A torque request module 304 may determine a torque request 308 based on one or more driver inputs 312, such as an accelerator pedal position, a brake pedal position, a cruise control input, and/or one or more other suitable driver inputs. The torque request module 304 may determine the torque request 308 additionally or alternatively based on one or more other torque requests, such as torque requests generated by the ECM 114 and/or torque requests received from other modules of the vehicle, such as the transmission control module 194, the hybrid control module 196, a chassis control module, etc. One or more engine actuators may be controlled based on the torque request 308 and/or one or more other vehicle operating parameters.

For example, a throttle control module 316 may determine a target throttle opening 320 based on the torque request 308. The throttle actuator module 116 may adjust opening of the throttle valve 112 based on the target throttle opening 320. A spark control module 324 may determine a target spark timing 328 based on the torque request 308. The spark actuator module 126 may generate spark based on the target spark timing 328.

A fuel control module 332 may determine one or more target fueling parameters 336 based on the torque request 308. For example, the target fueling parameters 336 may include number of fuel injection pulses (per combustion event), timing for each pulse, and amount for each pulse. The fuel actuator module 124 may inject fuel based on the target fueling parameters 336.

A cylinder control module 340 may determine a target number of cylinders to deactivate and/or deactivate 344 based on the torque request 308. The cylinder actuation module 120 may activate and deactivate cylinders of the engine 102 based on the target number 344. An EGR control module 348 may determine a target EGR opening 352 for the EGR valve 270 based on the torque request 308. The EGR actuator module 274 may control the EGR valve 270 based on the target EGR opening 352.

A boost control module 356 may determine a target boost 360 based on the torque request 308. The boost actuator module 264 may control the cutoff valve 260 based on the target boost 360. The boost actuator module 264 may, for example, determine a target position for the cutoff valve 260 based on the target boost 360 and control the cutoff valve 260 based on the target position. Additionally or alternatively, the boost actuator module 264 may determine a target duty cycle based on the target boost 360 and apply a pulse width modulation (PWM) signal to the cutoff valve 260 based on the target duty cycle. The boost actuator module 264 may additionally or alternatively determine target positions for the first and second turbine bypass valves 237 and 238 based on the target boost 360 and control the first and second turbine bypass valves 237 and 238 based on the target positions, respectively. When the cutoff valve 260 is closed, the boost actuator module 264 may open the second compressor bypass valve 242.

In various implementations, the cutoff valve 260 may be a two-position device, and the boost actuator module 264 may determine whether to open the cutoff valve 260 to a predetermined open position or to close the cutoff valve 260 to a predetermined closed position based on the target boost 360. The boost actuator module 264 may open the cutoff valve 260 to the predetermined open position or close the cutoff valve 260 to the predetermined closed position based on the determination.

Based on the torque request 308, a phaser control module 364 determines target phaser positions 368 for the intake camshaft 140, the second intake camshaft, the exhaust camshaft 142, and the second exhaust camshaft. The phaser actuator module 158 controls phasing of the intake and exhaust camshafts 140 and 142 via the intake and exhaust cam phasers 148 and 150 based on the target phaser positions 368 for the intake camshaft 140 and the exhaust camshaft 142, respectively. The phaser actuator module 158 may also control phasing of the second intake and exhaust camshafts via the second intake and exhaust cam phasers based on the target phaser positions 368 for the second intake camshaft and the second exhaust camshaft, respectively.

A mean effective pressure (MEP) module 372 may determine an indicated mean effective pressure (IMEP) for a combustion cycle of the cylinder 118. While determination and use of IMEP will be discussed, other MEPs may be determined and used, such as mean effective pressure (MEP), braking mean effective pressure (BMEP), etc.

The MEP module 372 may determine the IMEP for a combustion cycle of the cylinder 118 based on cylinder pressures measured within the cylinder 118 during the combustion cycle. The MEP module 372 may determine an IMEP for each combustion cycle of each of cylinder of the engine 102. The IMEPs are collectively illustrated by 380. Cylinder pressures measured within the cylinders, respectively, are collectively illustrated by 376. In various implementations, the MEP module 372 may determine the IMEPs 380 based on engine speeds at predetermined crankshaft positions of combustion cycles of the cylinders, respectively. While examples of determining the IMEPs 380 based on cylinder pressure and engine speed have been provided, the IMEPs 380 may be determined in another suitable manner including using one or more other measured parameters.

An imbalance module 384 indicates whether the first bank 204 of cylinders and the second bank 212 of cylinders are imbalanced. The imbalance module 384 may determine whether the first and second banks 204 and 212 are imbalanced based on the IMEPs 380 of the cylinders of the first bank 204 and the IMEPs 380 of the cylinders of the second bank 212.

For example only, the imbalance module 384 may determine a first imbalance parameter for the first bank 204 of cylinders based on the IMEPs 380 of the cylinders of the first bank 204. The imbalance module 384 may determine the first imbalance parameter, for example, based on an average of the IMEPs 380 of the cylinders of the first bank 204 over a predetermined period.

The imbalance module 384 may determine a second imbalance parameter for the second bank 212 of cylinders based on the IMEPs 380 of the cylinders of the second bank 212. The imbalance module 384 may determine the second imbalance parameter, for example, based on an average of the IMEPs 380 of the cylinders of the second bank 212 over the predetermined period.

The imbalance module 384 may determine a bank-to-bank imbalance parameter based on a difference between the first and second imbalance parameters. The imbalance module 384 may determine the bank-to-bank imbalance parameter, for example, based on an absolute value of the difference.

The imbalance module 384 indicates whether the first and second banks 204 and 212 are imbalanced via an imbalance signal 388. The imbalance module 384 may determine whether the first and second banks 204 and 212 are imbalanced based on the bank-to-bank imbalance parameter.

For example, the imbalance module 384 may determine that the first and second banks 204 and 212 are imbalanced when the bank-to-bank imbalance parameter is greater than a predetermined imbalance value. The imbalance module 384 may determine that the first and second banks 204 and 212 are not imbalanced when the bank-to-bank imbalance parameter is less than the predetermined imbalance value. The predetermined imbalance value may be calibratable and may be set, for example, based on a value of the bank-to-bank imbalance parameter where a noise, vibration, and/or harshness parameter is unacceptable. While the example of determining whether the first and second banks 204 and 212 are imbalanced based on the IMEPs 380/MEPs is provided, the imbalance module 384 may determine whether the first and second banks 204 and 212 are imbalanced in another suitable manner.

When the first and second banks 204 and 212 are not imbalanced, the phaser control module 364 determines the target phaser positions 368 for one of the first and second banks 204 and 212 based on the torque request 308 and one or more engine operating parameters. For purposes of discussion only, the first bank 204 will be discussed as being the one of the first and second banks 204 and 212. The phaser control module 364 and sets the target phaser positions 368 for the other one of the first and second banks 204 and 212 to the same values. The second bank 212 will be discussed as being the other one of the first and second banks 204 and 212 for purposes of discussion. However, the second bank 212 could alternatively be used as the one of the first and second banks 204 and 212, and the first bank 204 could alternatively be used as the other one of the first and second banks 204 and 212.

When the first and second banks 204 and 212 are imbalanced and one or more enabling conditions are satisfied, the phaser control module 364 may determine the target phaser positions 368 as described in detail below. In various implementations, no enabling conditions may be required. The one or more enabling conditions may be satisfied, for example, when the cutoff valve 260 is in the predetermined closed position and/or one or more other suitable conditions are present that indicate that there may be a (back) pressure difference between the first and second exhaust pipes 220 and 224. The difference in pressure between the first and second exhaust pipes 220 and 224 may cause the first and second banks 204 and 212 to be imbalanced.

When the first and second banks 204 and 212 are imbalanced and the one or more enabling conditions are satisfied, the phaser control module 364 determines the target phaser positions 368 for the first bank 204 based on the torque request 308 and the one or more engine operating parameters. The phaser control module 364 also determines the target phaser positions 368 for the second bank 212 based on the torque request 308 and the one or more engine operating parameters.

Determining the target phaser positions 368 for both of the first and second banks 204 and 212 based on the torque request 308 and the one or more engine operating parameters when the first and second banks 204 and 212 are imbalanced may reduce the imbalance. Determining the target phaser positions 368 for both of the first and second banks 204 and 212 may adjust the second imbalance parameter (determined for the second bank 212) toward the first imbalance parameter.

When the first and second banks 204 and 212 remain imbalanced (e.g., a predetermined period after the intake and exhaust camshafts of the second bank 212 are phased based on the target phaser positions 368 determined for the second bank 212), the phaser control module 364 offsets one or both of the target phaser positions 368 determined for the first bank 204. The phaser control module 364 continues to determine the target phaser positions 368 for the second bank 212 based on the torque request 308 and the one or more engine operating parameters.

The phaser control module 364 may offset one or both of the target phaser positions 368 determined for the first bank 204 (based on the torque request and the one or more engine operating parameters) by predetermined amounts in various implementations. The phaser control module 364 may incrementally offset one or both of the target phaser positions 368 every predetermined period, such as once per one or more engine cycles. An engine cycle may refer to the period necessary for each of the cylinders to complete one combustion cycle.

In other implementations, the phaser control module 364 may determine the offset(s), for example, based on a comparison of the first and second imbalance values and/or a comparison of the IMEPs 380 of the first bank 204 with the IMEPs 380 of the second bank 212. For example only, the phaser control module 364 may set the offset(s) to adjust at least one of the target phaser positions 368 determined for the first bank 204 to trap less residual exhaust gas and draw in more air when the IMEPs 380 of the cylinders of the first bank 204 are relatively less than the IMEPs 380 of the cylinders of the second bank 212. Conversely, the phaser control module 364 may set the offset(s) to adjust at least one of the target phaser positions 368 determined for the first bank 204 to trap more residual exhaust gas and draw in less air when the IMEPs 380 of the cylinders of the first bank 204 are relatively greater than the IMEPs 380 of the cylinders of the second bank 212.

The phaser control module 364 offsets (advances or retards) values of the target phaser positions 368 determined for the one of the first and second banks 204 and 212 based on the torque request 308 and the one or more engine operating parameters. Offsetting the target phaser positions 368 determined for the first bank 204 may reduce the imbalance. Offsetting the target phaser positions 368 determined for the first bank 204 may adjust the first imbalance parameter (determined for the first bank 204) toward the second imbalance parameter.

Figure 4:
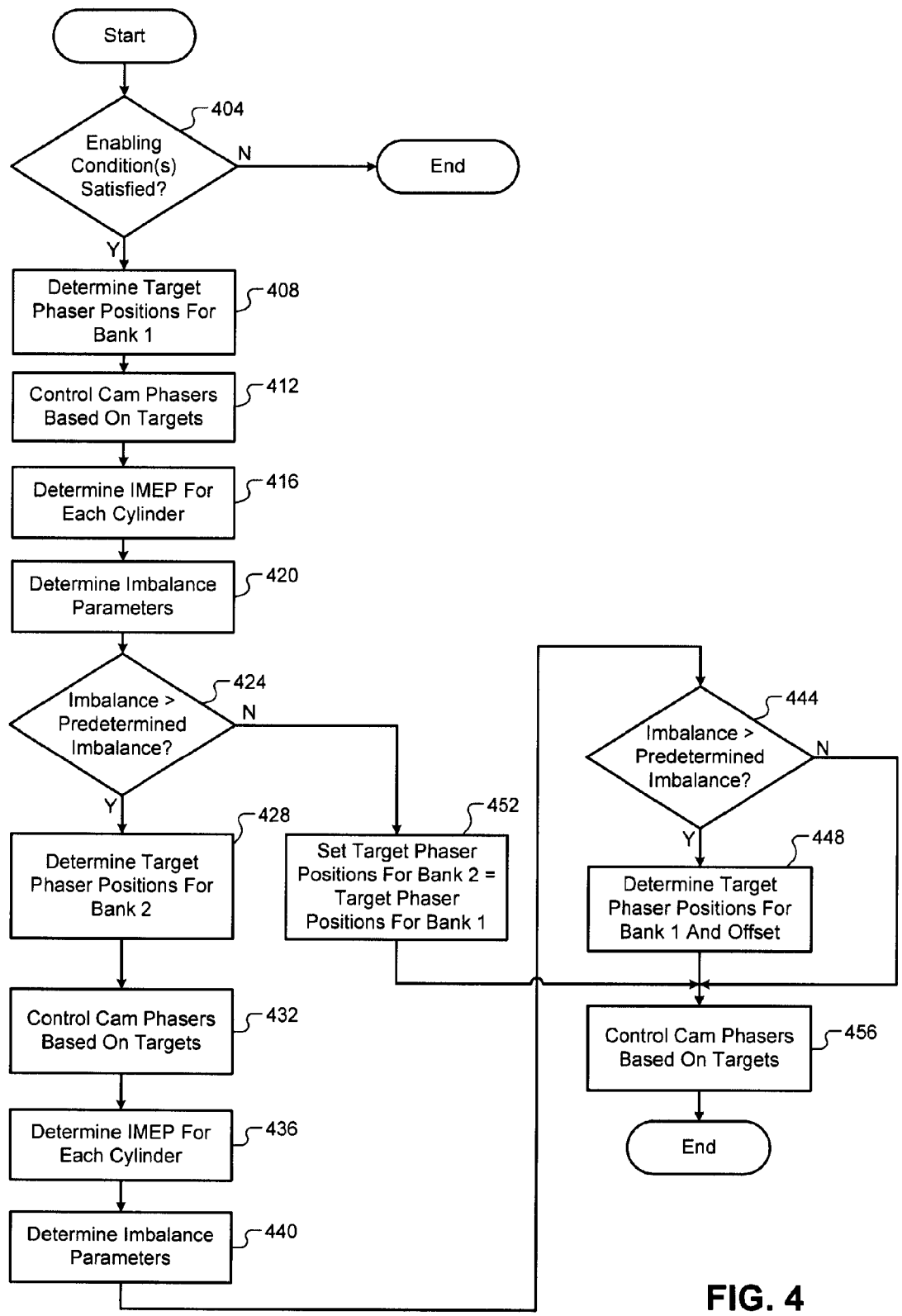
FIG. 4 is a flowchart depicting an example method of controlling camshaft phasing according to the present disclosure.

Referring now to FIG. 4, a flowchart depicting an example method of controlling camshaft phasing is presented. Control may begin with 404 where the phaser control module 364 may determine whether the one or more enabling conditions are satisfied. If 404 is true, control may continue with 408. If 404 is false, control may end. The one or more enabling conditions may be satisfied, for example, when the cutoff valve 260 is in the predetermined closed position and/or one or more other suitable conditions are present that indicate that there may be a (back) pressure difference between the first and second exhaust pipes 220 and 224.

At 408, the phaser control module 364 may determine the target phaser positions 368 for one of the first and second banks 204 and 212 of cylinders. The first bank 204 will be discussed as being the one of the first and second banks 204 and 212. The phaser control module 364 determines the target phaser positions 368 for the first bank 204 of cylinders based on the torque request 308 and the one or more engine operating parameters.

The phaser actuator module 158 may control the intake and exhaust cam phasers of the first bank 204 based on the target phaser positions 368 for the first bank 204 of cylinders, respectively, at 412. The MEP module 372 may determine the IMEPs 380 for the combustion cycles of the cylinders, respectively, at 416. The imbalance module 384 determines the first and second imbalance parameters for the first and second banks 204 and 212 at 420. The imbalance module 384 may determine the first imbalance parameter for the first bank 204 of cylinders based on the IMEPs 380 of the cylinders of the first bank 204. The imbalance module 384 may determine the second imbalance parameter for the second bank 212 of cylinders based on the IMEPs 380 of the cylinders of the second bank 212. The imbalance module 384 may also determine the bank-to-bank imbalance parameter at 420 based on the first and second imbalance parameters.

The imbalance module 384 may determine whether the bank-to-bank imbalance parameter is greater than the predetermined imbalance value at 424. If 424 is true, the imbalance module 384 indicates that the first and second banks 204 and 212 are imbalanced, the phaser control module 364 may determine the target phaser positions 368 for the other one of the first and second banks 204 and 212 based on the torque request 308 and the one or more engine operating parameters at 428, and control continues with 432-444. As the first bank 204 is being discussed as being the one of the first and second banks 204, the second bank 212 will be discussed as being the other one of the first and second banks 422. Determining the target phaser positions 368 for the second bank 212 of cylinders based on the torque request 308 and the one or more engine operating parameters may reduce the imbalance between the first and second banks 204 and 212.

If 424 is false, the imbalance module 384 indicates that the first and second banks 204 and 212 are not imbalanced, and the phaser control module 364 sets the target phaser positions 368 for the second bank 212 of cylinders equal to the target phaser positions 368 for the first bank 204 of cylinders, respectively, at 452. Control continues with 456, which is discussed further below.

At 432, the phaser actuator module 158 may control the intake and exhaust cam phasers of the second bank 212 based on the target phaser positions 368 for the second bank 212 of cylinders, respectively. The MEP module 372 may determine the IMEPs 380 for the combustion cycles of the cylinders, respectively, at 436. The imbalance module 384 may determine the first and second imbalance parameters for the first and second banks 204 and 212 at 440. The imbalance module 384 may also determine the bank-to-bank imbalance parameter based on the first and second imbalance parameters at 440.

The imbalance module 384 may determine whether the bank-to-bank imbalance parameter is greater than the predetermined imbalance value at 444. If 444 is false, the imbalance module 384 may indicate that the first and second banks 204 and 212 are not imbalanced, the phaser control module 364 may determine the target phaser positions 368 for the one of the first and second banks 204 and 212 based on the torque request 308 and the one or more engine operating parameters, set the target phaser positions 368 for the other one of the first and second banks 204 and 212 to the same values, and control may transfer to 456.

If 444 is true, the imbalance module 384 indicates that the first and second banks 204 and 212 are imbalanced, and control may continue with 448. At 448, the phaser control module 364 may determine the target phaser positions 368 for the first bank 204 of cylinders (i.e., the one of the first and second banks 204 and 212) based on the torque request 308 and the one or more engine operating parameters and offset one or more of the target phaser positions 368 for the first bank 204 of cylinders. Offsetting one or more of the target phaser positions 368 for the first bank 204 of cylinders may reduce the imbalance between the first and second banks 204 and 212. At 456, the intake and exhaust cam phasers of the first and second banks 204 and 212 are controlled based on the target phaser positions 368, respectively. In various types of systems, 412 and 432 may be omitted.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system comprising:
    a mean effective pressure (MEP) module that determines MEPs for combustion cycles of cylinders, respectively, of an engine;
    an imbalance module that selectively determines whether first and second banks of the cylinders are imbalanced based on the MEPs; and
    a phaser control module that, when the first and second banks of cylinders are imbalanced, selectively adjusts at least one of:
        a first phaser of an intake camshaft of the second bank of cylinders; and
        a second phaser of an exhaust camshaft of the second bank of cylinders.

2. The engine control system of claim 1 wherein the phaser control module:
    determines first and second target phaser positions for the first bank of cylinders;
    controls a third phaser of a second intake camshaft of the first bank of cylinders based on the first target phaser position;
    controls a fourth phaser of a second exhaust camshaft of the first bank of cylinders based on the second target phaser position; and,
    when the first and second banks of cylinders are not imbalanced:
        sets third and fourth target phaser positions for the second bank of cylinders equal to the first and second target phaser positions, respectively;
        controls the first phaser based on the third target phaser position; and
        controls the second phaser based on the fourth target phaser position.

3. The engine control system of claim 1 wherein the phaser control module:
    determines first and second target phaser positions for the first bank of cylinders based on a torque request and at least one engine operating parameter;
    controls a third phaser of a second intake camshaft of the first bank of cylinders based on the first target phaser position;
    controls a fourth phaser of a second exhaust camshaft of the first bank of cylinders based on the second target phaser position; and,
    when the first and second banks of cylinders are imbalanced:

determines third and fourth target phaser positions for the second bank of cylinders based on the torque request and the at least one engine operating parameter;

controls the first phaser based on the third target phaser position; and controls the second phaser based on the fourth target phaser position.

4. The engine control system of claim 1 wherein, when the first and second banks of cylinders are imbalanced after the adjustment, the phaser control module further selectively adjusts at least one of:

a third phaser of a second intake camshaft of the first bank of cylinders; and a fourth phaser of a second exhaust camshaft of the first bank of cylinders.

5. The engine control system of claim 4 wherein the phaser control module:

determines first and second target phaser positions for the first bank of cylinders;

controls a third phaser of a second intake camshaft of the first bank of cylinders based on the first target phaser position;

controls a fourth phaser of a second exhaust camshaft of the first bank of cylinders based on the second target phaser position; and, when the first and second banks of cylinders are imbalanced after the adjustment, selectively adjusts at least one of the first and second target phaser positions by a predetermined amount.

6. The engine control system of claim 5 wherein the phaser control module:

determines the first and second target phaser positions based on a torque request and at least one engine operating parameter;

determines third and fourth target phaser positions based on the torque request and the at least one engine operating parameter;

controls the first phaser based on the third target phaser position; and controls the second phaser based on the fourth target phaser position.

7. The engine control system of claim 1 further comprising a boost actuator module that selectively decreases opening of a cutoff valve to decrease exhaust flow through the cutoff valve and a turbocharger turbine, wherein the phaser control module selectively adjusts at least one of the first and second phasers when the first and second banks of cylinders are imbalanced and the opening of the cutoff valve is decreased.

8. The engine control system of claim 1 wherein the phaser control module selectively adjusts at least one of the first and second phasers when the first and second banks of cylinders are imbalanced and a first pressure in a first exhaust pipe that receives exhaust from the first bank of cylinders is one of greater than and less than a second pressure in a second exhaust pipe that receives exhaust from the second bank of cylinders.

9. The engine control system of claim 1 wherein the imbalance module determines a first imbalance parameter for the first bank of cylinders based on the MEPs of the cylinders of the first bank, determines a second imbalance parameter for the second bank of cylinders based on the MEPs of the cylinders of the second bank, and determines whether the first and second banks of cylinders are imbalanced based on the first and second imbalance parameters.

10. The engine control system of claim 9 wherein the imbalance module determines a bank-to-bank imbalance parameter based on the first and second imbalance parameters and determines whether the first and second banks of cylinders are imbalanced based on a comparison of the bank-to-bank imbalance parameter and a predetermined imbalance value.

11. An engine control method comprising:

determining mean effective pressures (MEPs) for combustion cycles of cylinders, respectively, of an engine;

selectively determining whether first and second banks of the cylinders are imbalanced based on the MEPs; and, when the first and second banks of cylinders are imbalanced, selectively adjusting at least one of:

a first phaser of an intake camshaft of the second bank of cylinders; and a second phaser of an exhaust camshaft of the second bank of cylinders.

12. The engine control method of claim 11 further comprising:

determining first and second target phaser positions for the first bank of cylinders;

controlling a third phaser of a second intake camshaft of the first bank of cylinders based on the first target phaser position;

controlling a fourth phaser of a second exhaust camshaft of the first bank of cylinders based on the second target phaser position; and, when the first and second banks of cylinders are not imbalanced:

setting third and fourth target phaser positions for the second bank of cylinders equal to the first and second target phaser positions, respectively;

controlling the first phaser based on the third target phaser position; and controlling the second phaser based on the fourth target phaser position.

13. The engine control method of claim 11 further comprising:

determining first and second target phaser positions for the first bank of cylinders based on a torque request and at least one engine operating parameter;

controlling a third phaser of a second intake camshaft of the first bank of cylinders based on the first target phaser position;

controlling a fourth phaser of a second exhaust camshaft of the first bank of cylinders based on the second target phaser position; and, when the first and second banks of cylinders are imbalanced:

determining third and fourth target phaser positions for the second bank of cylinders based on the torque request and the at least one engine operating parameter;

controlling the first phaser based on the third target phaser position; and controlling the second phaser based on the fourth target phaser position.

14. The engine control method of claim 11 further comprising, when the first and second banks of cylinders are imbalanced after the adjustment, selectively adjusting at least one of:

a third phaser of a second intake camshaft of the first bank of cylinders; and a fourth phaser of a second exhaust camshaft of the first bank of cylinders.

15. The engine control method of claim 14 further comprising:
- determining first and second target phaser positions for the first bank of cylinders;
- controlling a third phaser of a second intake camshaft of the first bank of cylinders based on the first target phaser position;
- controlling a fourth phaser of a second exhaust camshaft of the first bank of cylinders based on the second target phaser position; and,
- when the first and second banks of cylinders are imbalanced after the adjustment, selectively adjusting at least one of the first and second target phaser positions by a predetermined amount.

16. The engine control method of claim 15 further comprising:
- determining the first and second target phaser positions based on a torque request and at least one engine operating parameter;
- determining third and fourth target phaser positions based on the torque request and the at least one engine operating parameter;
- controlling the first phaser based on the third target phaser position; and
- controlling the second phaser based on the fourth target phaser position.

17. The engine control method of claim 11 further comprising:
- selectively decreasing opening of a cutoff valve to decrease exhaust flow through the cutoff valve and a turbocharger turbine; and
- selectively adjusting at least one of the first and second phasers when the first and second banks of cylinders are imbalanced and the opening of the cutoff valve is decreased.

18. The engine control method of claim 11 further comprising selectively adjusting at least one of the first and second phasers when the first and second banks of cylinders are imbalanced and a first pressure in a first exhaust pipe that receives exhaust from the first bank of cylinders is one of greater than and less than a second pressure in a second exhaust pipe that receives exhaust from the second bank of cylinders.

19. The engine control method of claim 11 further comprising:
- determining a first imbalance parameter for the first bank of cylinders based on the MEPs of the cylinders of the first bank;
- determining a second imbalance parameter for the second bank of cylinders based on the MEPs of the cylinders of the second bank; and
- determining whether the first and second banks of cylinders are imbalanced based on the first and second imbalance parameters.

20. The engine control method of claim 19 further comprising:
- determining a bank-to-bank imbalance parameter based on the first and second imbalance parameters; and
- determining whether the first and second banks of cylinders are imbalanced based on a comparison of the bank-to-bank imbalance parameter and a predetermined imbalance value.

* * * * *